J. BRONKAR.
BRICK-KILN.
No. 177,684.            Patented May 23, 1876.
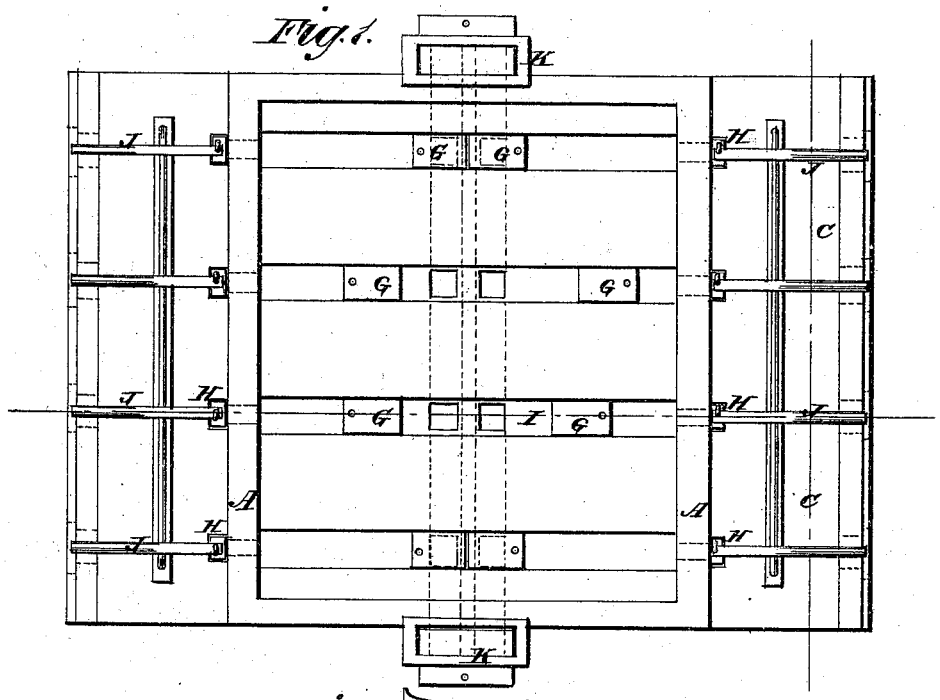
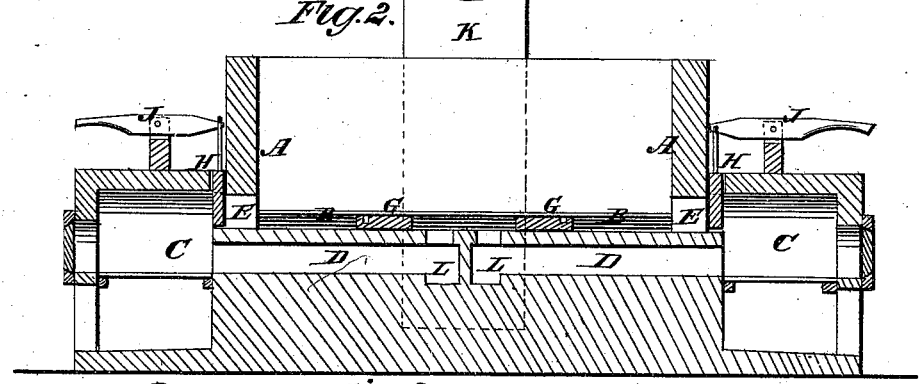
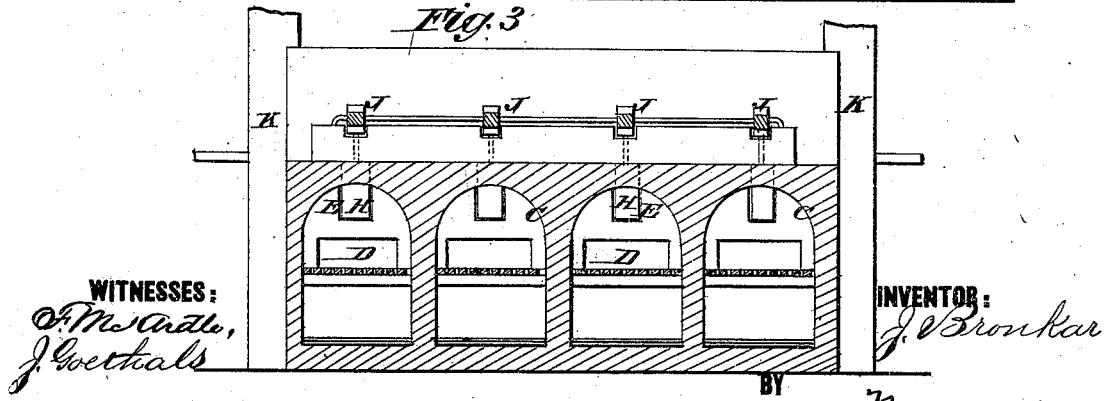

UNITED STATES PATENT OFFICE.

JEROME BRONKAR, OF ZANESVILLE, OHIO.

IMPROVEMENT IN BRICK-KILNS.

Specification forming part of Letters Patent No. 177,684, dated May 23, 1876; application filed February 5, 1876.

*To all whom it may concern:*

Be it known that I, JEROME BRONKAR, of Zanesville, in the county of Muskingum and State of Ohio, have invented a new and Improved Brick-Kiln, of which the following is a specification:

The invention consists in the improvement of brick-kilns by a peculiar mode of combining furnaces and chimneys with long, short, and cross flues, as hereinafter more fully described.

Figure 1 is a top view of my improved kiln. Fig. 2 is a sectional elevation taken on line $x$ $x$ of Fig. 1, and Fig. 3 is a section on line $y\ y$ of Fig. 1.

Similar letters of reference indicate corresponding parts.

A represents the exterior walls of the kiln, and B the floor or foundation on which the bricks are piled for burning. C represents the furnaces, which are arranged outside of the walls A, on opposite sides, and connected with the interior by one long flue, D, extending along under the floor to the center, and by another short one, E, entering through the side wall, so as to supply the heat to the side. G is a damper for flue D, and H a damper for flue E. Damper G slides in a groove, I, in the floor of the kiln, being operated by a rod inserted through the furnace, and H is operated by a lever, J. K represents chimneys, connected with flues D by cross-flues L, for carrying off the smoke at starting.

By this contrivance the operation of the kiln can be regulated and controlled much better than as commonly arranged, and the flues can be controlled better.

Having thus described my invention, I claim as new and desire to secure by Letters Patent—

The combination of the outer furnaces C C, dampered flues D E, cross-flues L, and chimneys K, arranged substantially as and for the purpose specified, whereby the smoke may be excluded from the kiln until all moisture has been evaporated from the bricks.

JEROME BRONKAR.

Witnesses:
J. M. W. KING,
THOS. WICKHAM.